United States Patent [19]

Swierski

[11] Patent Number: 5,509,209

[45] Date of Patent: Apr. 23, 1996

[54] LASER PLUMBING DEVICE

[75] Inventor: Thomas Swierski, Charlotte, N.C.

[73] Assignee: Gail Marie Tartaro, Dania, Fla.

[21] Appl. No.: 266,185

[22] Filed: Jun. 27, 1994

[51] Int. Cl.$^6$ ........................................ G01C 15/02
[52] U.S. Cl. .................. 33/282; 33/227; 33/286; 33/378; 33/396
[58] Field of Search .................... 33/282, 286, 290, 33/283, 285, 291, 227, 378, 396, DIG. 21

[56] References Cited

U.S. PATENT DOCUMENTS 3,505,739  4/1970  Abrams ........................................ 33/227
3,874,088  4/1975  Shaffer, Jr. ................................... 33/286
4,949,467  8/1990  Oman et al. ................................. 33/291
5,184,406  2/1993  Swierski ...................................... 33/291

Primary Examiner—Christopher W. Fulton

[57] ABSTRACT

In a projected light plumb device which is buoyantly supported within a fluid-filled container on a float platform which is horizontally supported by the fluid, an improvement wherein the float platform is inclined upwardly from its outer diameter to its inner diameter on its lower surface which rests in the fluid to allow any developed air bubbles on the lower surface of the float platform to escape. Improvements also include a locator plate to align the container. The locator plant has apertures to view and align a locator mark on the surface on which the device is placed with indicia on the locator plate.

8 Claims, 5 Drawing Sheets

LASER PLUMBING DEVICE

BACKGROUND OF THE INVENTION

This present invention relates to improvements in projected light plumb devices which are generally utilized to vertically align a floor position with a corresponding ceiling position or vice versa in which a light projecting device is buoyantly supported within a fluid filled container. The light projecting device is mounted on a float platform which is horizontally supported by the floor in such a manner that regardless of the floor's inclination, the light projecting device will transmit a beam of light along a vertical line.

Such a device is disclosed in my prior patent U.S. Pat. No. 5,184,406 issued Feb. 9, 1993. The device therein is comprised of essentially three elements: a container retaining a quantity of the suspension fluid such as water, oil or the like, a float platform buoyantly supported by the fluid within the container, and a light projecting device mounted on the float platform in a manner so that the light projecting device will transmit a beam of light in a vertical line. In addition, the device has a support tube to allow the light projecting device to be selectively mounted on the platform.

The disclosure of my prior patent U.S. Pat. No. 5,184,406 is incorporated herein by reference.

The present invention is directed to improvements in the support platform, and the provision of a locator plate to allow the facile alignment of the device on a base or floor surface.

In my prior patent, the container had alignment markers formed in quadrants on the outside surfaces of the walls of the container.

In utilizing the device according to my prior patent, the support surface or floor was marked with perpendicular square lines to indicate at their intersection the point on the floor on which is desired to line up the upper ceiling point with the quadrant markings on the outer walls of the container aligned with these markings on the floor. This required sighting views and the alignment was easily subject to parallax error if the user was not careful. Furthermore, when the reverse procedure was followed; i.e. picking a point on the ceiling and marking a point on the floor directly below, the device would be moved to align with the point in the ceiling and four hatch marks were required to be made on the floor and then draw cross lines in order to mark the point on the floor directly below the point on the ceiling. This was somewhat time consuming and, as indicated subject to sighting or parallax errors and required a fair degree of care in carrying out the procedure.

In using the prior model of the device in U.S. Pat. No. 5,184,406, it has been found with the substantially flat lower surface of the float platform and the uninterrupted lower surface that when the device had recently been moved about that there was some tendency of air bubbles to form in the buoyant fluid adjacent the lower surface of the float platform. Such air bubbles were often distributed nonuniformily and could cause the introduction of minor errors in the absolute levelness of the float platform as one portion of the platform floated higher or lower than the other.

SUMMARY OF THE INVENTION

In accordance with the present invention, the light plumb device of the type disclosed in my prior U.S. Pat. No. 5,184,406 is improved in its ease of use, increase of accuracy in orienting the placement of the device on a floor surface, and in the float platform achieving an extremely accurate level condition.

In order to facilitate the location of the device over a predetermined point location on the floor surface, there is provided an annular plate having low profile sidewalls, a recessed ledge on the upper base thereof, four centrally located quadrant apertures the center of which are aligned with perpendicular axii, and a central aperture in the geometric center of the plate.

The lower surface of the base of the plate is provided with equally spaced feet for stability and facility in locating it on a floor surface that may have certain degree of unevenness in it. Utilizing this locator plate, the location is readily determined visually since the cross lines are directly visible throughout the perpendicular apertures and the central aperture can be placed directly over the point of floor reference and/or intersection of the lines. The outer edges of the quadrant apertures have indicia thereon to also facilitate the alignment with the underlying floor markings.

Further, in accordance with the present invention there is provided an improved float platform which increases the accuracy of obtaining an absolutely level platform for the light device by eliminating the build up of air bubbles under the supporting float platform. This end is achieved by constructing the support float platform in a donut-like shape comprising a hollow buoyant base member, the outer diameter of which is just slightly less than the inner diameter of the fluid container in a manner similar to the U.S. Pat. No. 5,184,406. The buoyant base platform is connected to and formed integrally with the base cup by one or more vertical ribs, rigidly, or fixedly connecting the ring with the cup.

The bottom surface of the buoyant member is designed so that the outermost or the widest portion is slightly lower than the inner portion with the outer edges to the connecting surface inclined upwardly from the inner edge. This permits any air bubbles to move upwardly and along the surface and escape at the inner edge to the atmosphere eliminating any possible inaccuracies due to the non-uniform distribution of surface bubbles on the lower surface of the floatation ring.

BRIEF DESCRIPTION OF THE DRAWING

Referring to the accompanying drawing which forms a part of this specification.

ILLUSTRATIVE SPECIFIC EMBODIMENT

Figure 1:
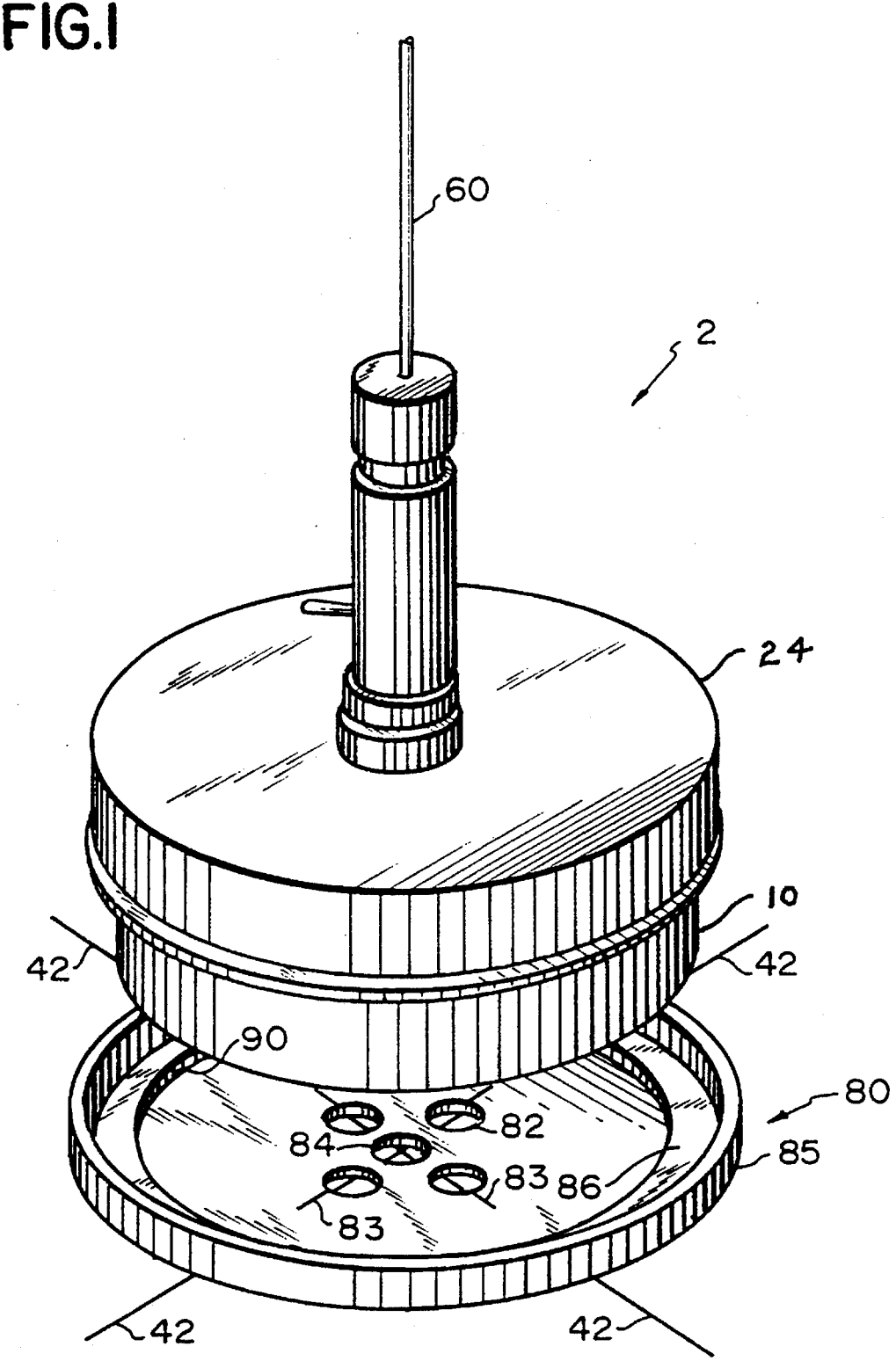
FIG. 1 is a perspective view of the improved device of the present invention being utilized with the new locator plate, the flotation container being placed in the locator plate which has been prealigned over the desired point on the floor surface.

The device of present invention is shown generally in FIG. 1.

Figure 2:
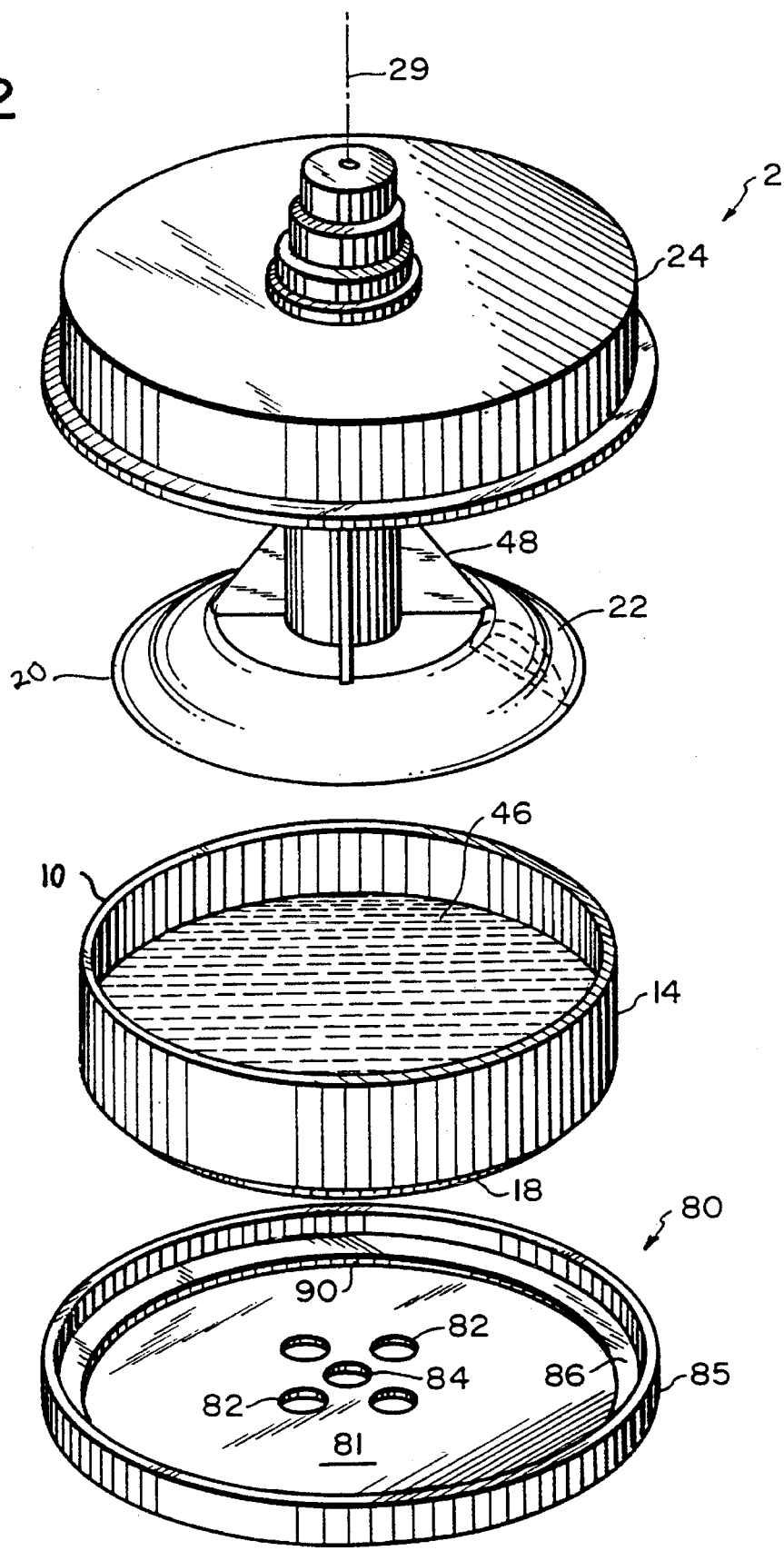
FIG. 2 is perspective view of the device of the present invention expanded to show the relationship of the individual components parts.

The component parts are shown in a perspective view in FIG. 2 which indicates the relationship of the components to each other.

The device 2 comprises the lower container 10 holding the suspension fluid 46. The container 10 has a base 12 and upwardly extending walls 14. The bottom surface 12 of the container 10 has an angular rim 18, inset from the outer edges. The float platform 22 is supported in the fluid 46 by the donut shaped buoyant base member 20. Cover 24 encloses the container 10.

The buoyant base member 20 is connected to the cylindrical support tube 28, by ribs 48.

Mounted on the top of a cylindrical support tube 28 is the laser device 30 contained in the cylindrical case 21. A battery 16 for the device 60 is shown in the lower part of the device 30 in the cutaway view. The vertical longitudinal axis of the device 30 is indicated by 29.

Figure 3:
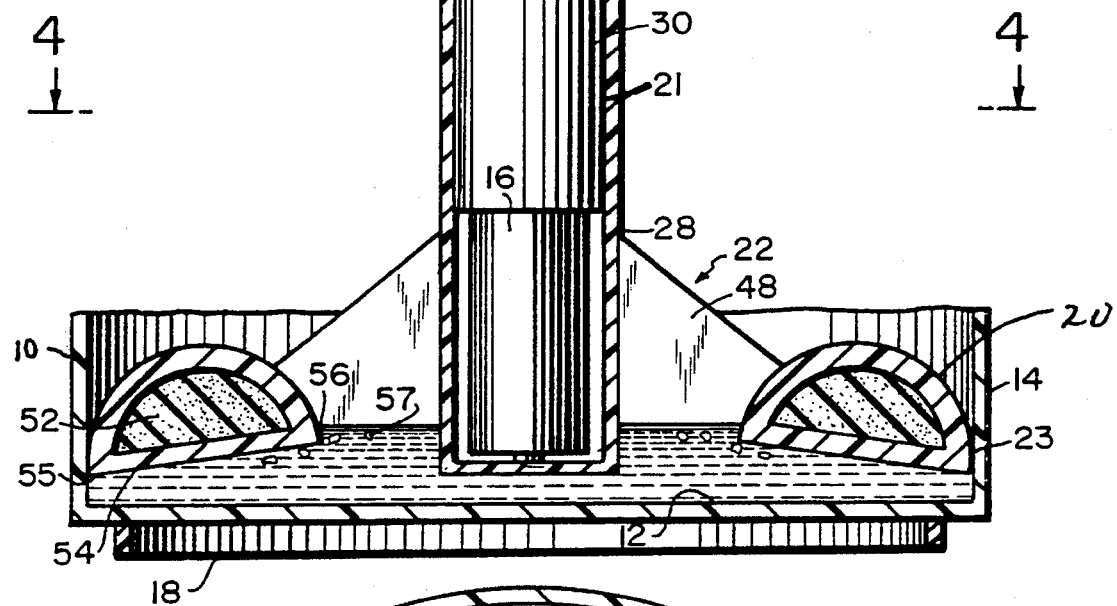
FIG. 3 is a cross-section of the fluid container and new float platform of the device.
Figure 4:
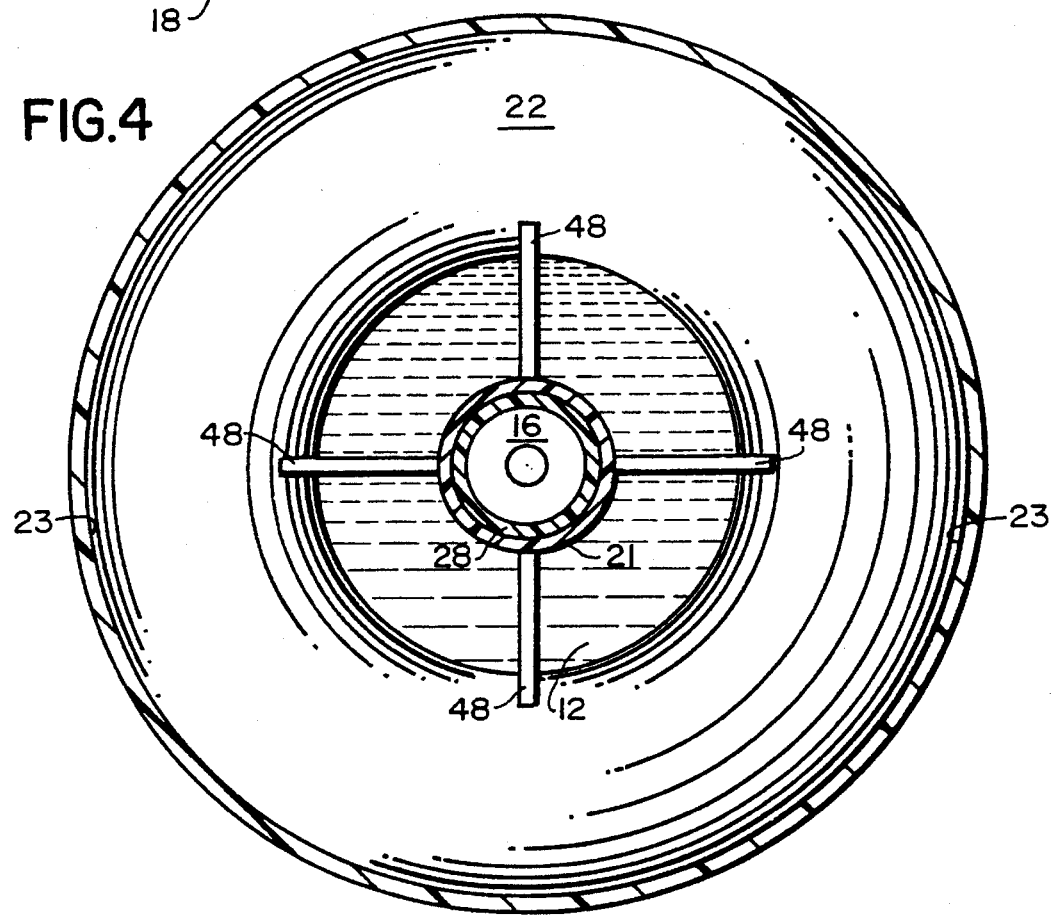
FIG. 4 is top view portion of the float platform of the present invention taken along lines 4—4 of FIG. 3.
Figure 5:
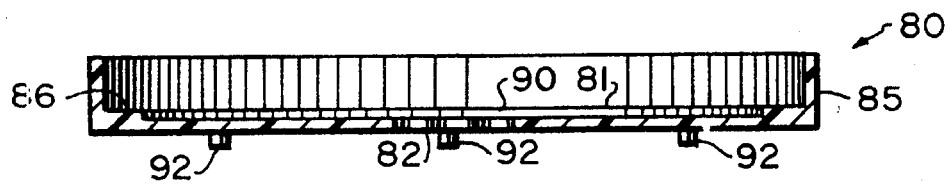
FIG. 5 is a cross-sectional view of the locator plate; along lines 5—5 of FIG. 6
Figure 6:
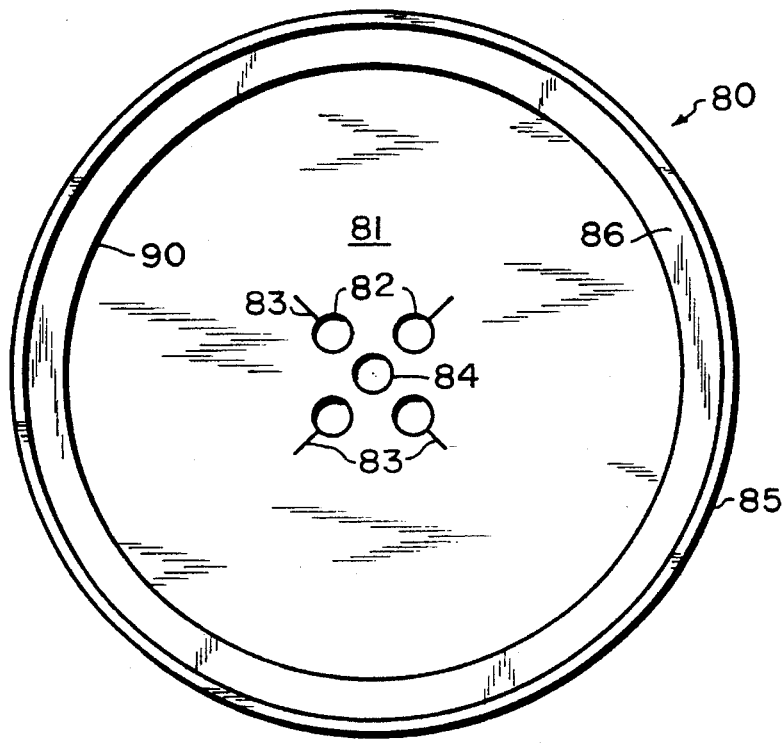
FIG. 6 is a top plan view of the locator plate of the device.
Figure 7:
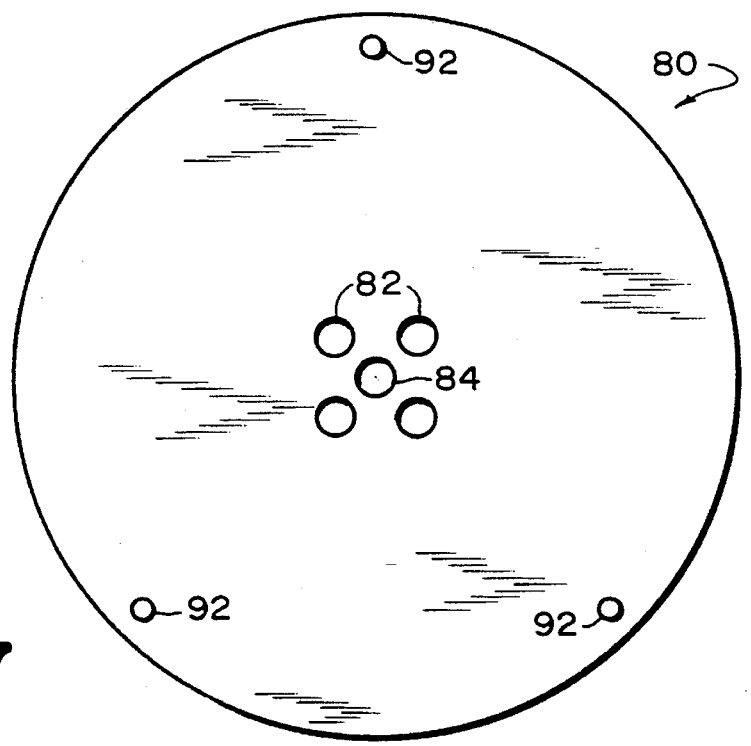
FIG. 7 is a bottom plan view of the locator plate of the invention.
Figure 8:
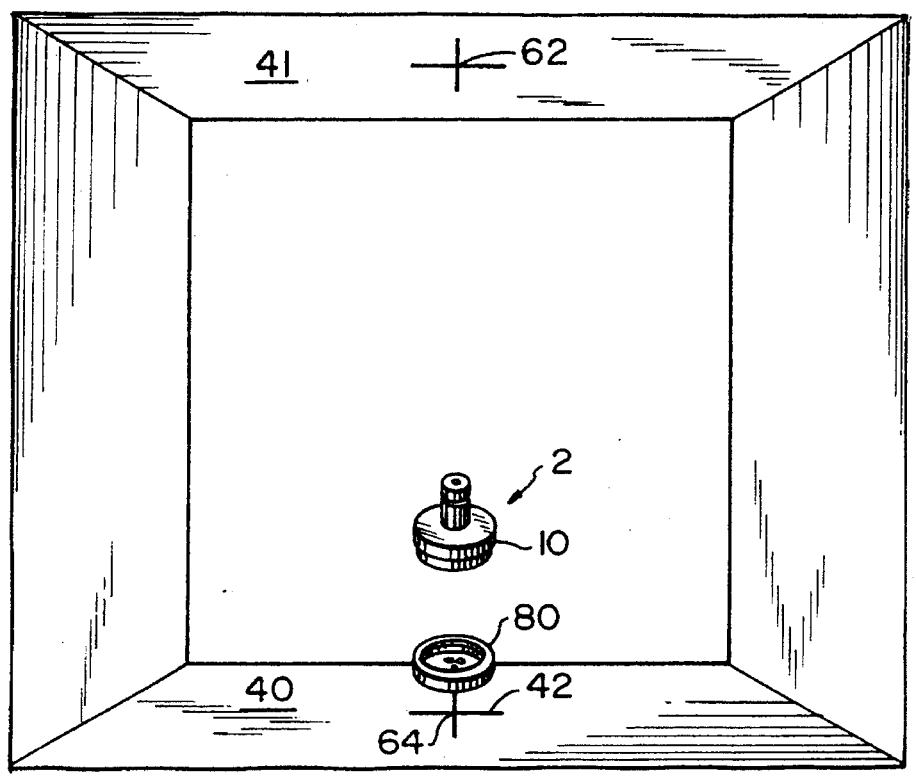
FIG. 8 is a perspective view of the invention in use.
Figure 9:
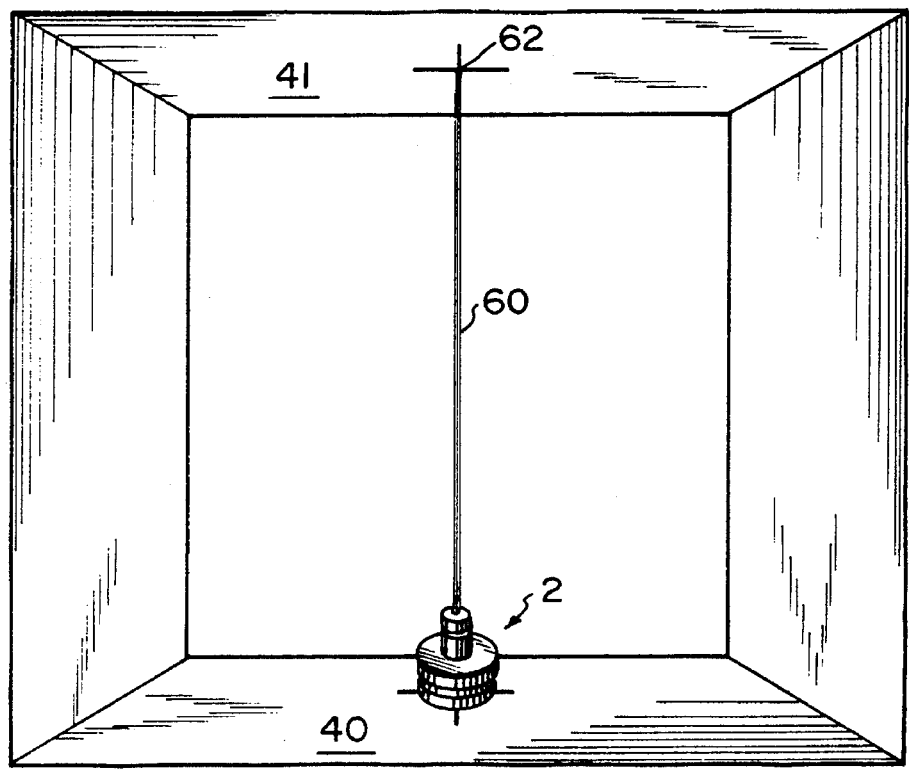
FIG. 9 is a perspective view of the device having located a desired ceiling point.

Vertical spaced ribs 48 connect the support tube 28 with the donut shaped float buoyant base member 22, which is shown filled with foam 52, but may also be completely hollow. The outer edge 55 of the member 22 has a diameter only slightly less than the inner diameter of the walls 14 of the container 10. This spacing is indicated at 23. The outside edge 55 is lower than the inner edge 56 and therefore the lower surface 54 is inclined upwardly and inwardly as shown best in FIG. 3. Accumulated air bubbles 57 will flow upwardly and out of the suspension fluid 46 into the atmosphere.

A projected light beam 60 from the laser device 30 is shown aimed at the point 62 on ceiling 41 and to locate the low point 64 on the floor.

The locator plate 80 includes the base 81 which has large apertures 82 centrally located which are on cross axis 90 degrees to each other and their axii pass through the center of central aperture and indicia 83 for orienting the plate 80. The plate 80 has upwardly turned outer walls 85 and a shelf 86. The inner diameter of walls 85 of plate 80 corresponds to slightly more than the outer diameter of wall 14 of the container 10. The shelf 86 is provided for seating the container 10 and is high enough to accommodate the depth of the rim 18 of the container 10. The lower surface of the plate 81 is provided with three feet 92 in order to accommodate the unevenness of the floor surface 40.

The support surface or floor is indicated in general at 40, the point 64 over which the device 2 is to be located is crisscrossed by lines 42 drawn at perpendicular angles to each other to facilitate the location.

In utilizing the device, the locator plate 80 is placed over the crossed lines 42 which are viewed through the apertures 82 and 84 and lining up the indicia 83. The cross point of the lines 42 and/or nail head or other point marked can then be viewed through the central aperture 84 for fine adjustment of the location. The container 10 is then placed in the plate 80 which accurately orients the axis 29 and the light beam 60 in line with the desired point 62 and the operation otherwise parallels that in my prior art patent.

The parts except for the laser operating components can all be made of plastic.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A projected light plumb device comprising a container, a float platform buoyantly supported within the container by a fluid suspension means, a light projecting device, and a support means for securing said light projecting device to said platform at a predetermined angular orientation wherein said container includes aligning means such that the light projecting device will transmit a beam of light to align a first position designated by said aligning means and a second position designated by said light projecting device, said float platform includes a donut shaped ring having an outer diameter slightly less than the inside dimension of the inner walls of said container, and an inner diameter, and said float platform is connected to said support means by spaced apart vertical ribs, and wherein said float platform has a lower surface which is inclined upwardly from said outer diameter to said inner diameter allowing any developed air bubbles on the lower surface thereof to escape therefrom.

2. A projected light plumb device comprising a container, a float platform buoyantly supported within the container by a fluid suspension means, a light projecting device, and a support means for securing said light projecting device to said platform at a predetermined angular orientation wherein said container includes aligning means such that the light projecting device will transmit a beam of light to align a first position designated by said aligning means and a second position designated by said light projecting device, said float platform comprising a donut shaped ring having an outer diameter slightly less than the inside dimension of the inner walls of said container, and an inner diameter, and wherein said container has a flat base surface having an annular rim spaced inwardly from the side walls and depending downwardly from said lower surface of said container, the outer diameter of said rim of said container being slightly less than the diameter of walls of an annular locator plate having sidewalls with an inner diameter slightly greater than the outer diameter of the walls of said container and the lower portion of said side walls of said locator plate are formed with a annular ledge projected inwardly from said walls of said locator plate and having an inner descending wall, said inner descending wall having an inner diameter slightly greater than the outer diameter of the annular rim of the base of said container.

3. A device as claimed is claim 2 wherein said locator plate is provided with a central aperture in the base thereof and at least three depending feet on the base thereof.

4. A device as claimed in claim 2 wherein said locator plate has aligning indicia on the base thereof.

5. A projected light plumb device comprising a container, a float platform buoyantly supported within the container by a fluid suspension means, a light projecting device, and a support means for securing said light projecting device to said platform at a predetermined angular orientation where said container includes aligning means such that the light projecting device will transmit a beam of light to a line of first position designated by said aligning means and a second position designated by said light projecting device, the float platform comprising a donut shaped ring having an outer diameter slightly less than the inside dimension of the inner walls of said container, and an inner diameter, and wherein said float platform is connected to said support means by spaced apart vertical ribs and wherein said float platform has a lower surface which is inclined upwardly from said outer diameter to said inner diameter allowing any developed air bubbles on the lower surface thereof to escape therefrom, and wherein said container has a flat base surface having an annular rim spaced inwardly from the side walls and depending downwardly from said lower surface of said container, the outer diameter of said rim of said container being slightly less than the diameter of walls of an annular locator plate having sidewalls with an inner diameter slightly greater than the outer diameter of the walls of said container and the lower portion of said side walls of said locator plate are formed with a annular ledge projected inwardly from said outer walls of said locator plate and having an inner descending wall, said inner descending wall having an inner diameter slightly greater than the outer diameter of the annular rim of the base of said container.

6. A device as claimed in claim 5 wherein said locator plate is provided with a central aperture in the base thereof and at least three depending feet on the base thereof.

7. A device as claimed in claim 6 wherein said locator plate has aligned indicia on the base there.

8. A device as claimed in claim 5 wherein said locator plate has aligned indicia on the base thereof.

* * * * *